Sept. 2, 1941.                 T. G. RABBITT                 2,254,781
                               SHOCK ABSORBER
                            Filed Dec. 26, 1940              2 Sheets-Sheet 1
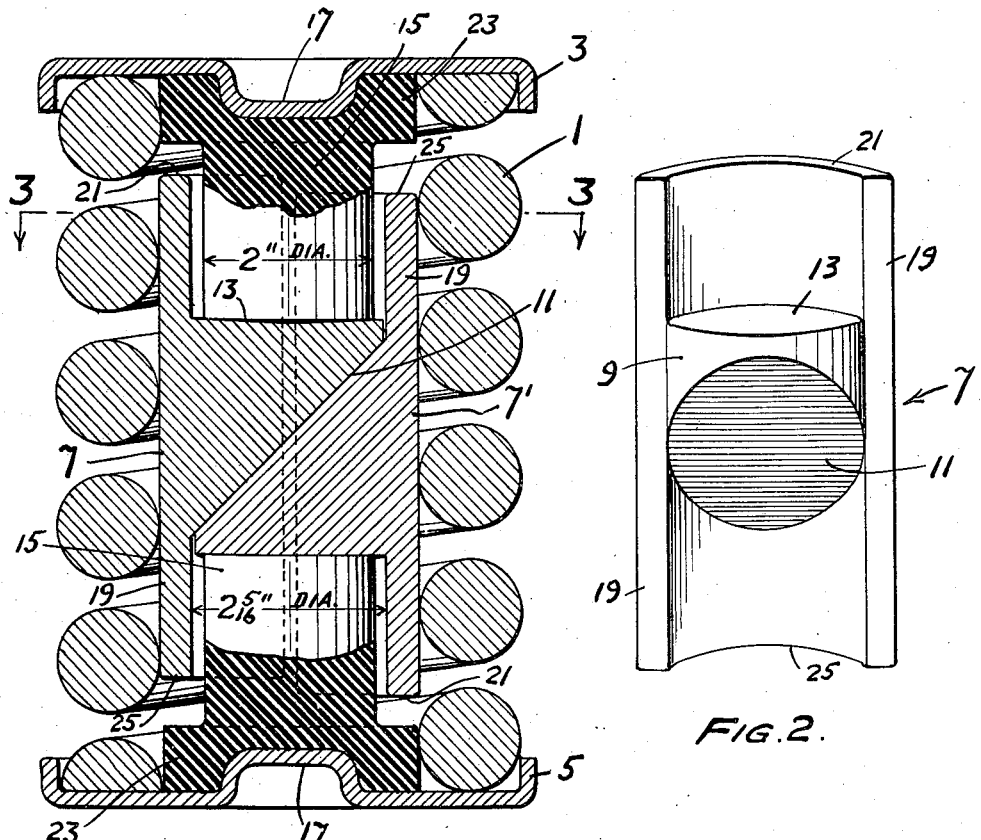
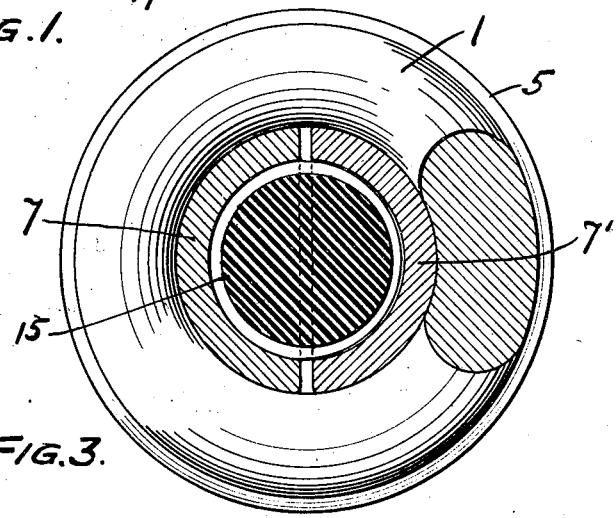
INVENTOR
Thomas G. Rabbitt
BY
Busser & Harding
ATTORNEYS
WITNESS:

Sept. 2, 1941. T. G. RABBITT 2,254,781
SHOCK ABSORBER
Filed Dec. 26, 1940 2 Sheets-Sheet 2

WITNESS:

INVENTOR
Thomas G. Rabbitt
BY
Busser & Harding.
ATTORNEYS.

Patented Sept. 2, 1941

2,254,781

UNITED STATES PATENT OFFICE 2,254,781

SHOCK ABSORBER

Thomas G. Rabbitt, Philadelphia, Pa., assignor to Sun Oil Company, Philadelphia, Pa., a corporation of New Jersey Application December 26, 1940, Serial No. 371,741

16 Claims. (Cl. 267—9)

This invention relates to shock absorbers or cushioning devices generally, but is described and illustrated in the accompanying drawings as a bolster support for railway cars.

An object of the present invention is to provide means to dampen harmonic motion set up in the helical springs customarily used in such cushioning devices.

It is well known that when helical springs are used in the side frames of railway freight cars to support the bolsters, and therefore the car and its load, a harmonic vertical motion of the car is set up due to a combination of the weight carried, the roadbed conditions, the speed of the train and the inherent characteristics of the springs. This motion is cumulative, resulting in increasing compression of the spring until the spring is finally compressed to its limit causing several shocks of terriffic intensity before the harmonic motion is stopped by the ultimate full compression of the spring. If the conditions above noted still maintain, the motion again starts up and reaches its climax with one or more blows of extreme intensity. The motion itself is not only injurious to perishable freight, but the final shocks are extremely injurious to the car structure and to the roadbed.

It is, therefore, an object of the present invention to provide a shock absorber comprising means for dampening the harmonic motion set up in such helical springs.

It is a further object of the invention to provide means to cushion such springs to prevent extreme shocks caused by complete uncontrolled compression thereof.

A still further object of the invention is to provide means to control lateral and longitudinal misalignment of the truck assembly generated and amplified by uncontrolled vertical motion of the helical springs and thereby prevent derailment of the cars.

Further objects of the present invention will appear from the following description associated with the accompanying drawings, in which:

Figure 1 is a central longitudinal section of the device.

Figure 2 is a side view, in perspective, of one of the dampening shoes used in accordance with the invention.

Figure 3 is a sectional view on the line 3—3 of Figure 1.

Figure 4:
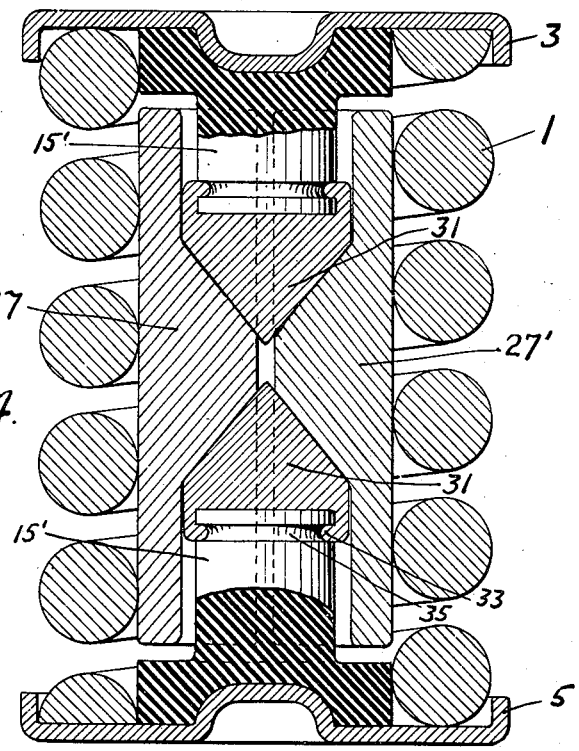
Figure 4 is a central longitudinal section of a modified form of device.

A conventional spiral or helical spring 1 is interposed between upper and lower follower plates 3 and 5, respectively, the construction of the shock absorber so far being wholly conventional in bolster supports for railway cars.

In the structure shown in Figures 1 to 3, there are enclosed within the spring 1 a pair of oppositely disposed segmental dampening shoes 7, 7'. Each shoe is provided, intermediate its ends, with an integrally formed wedge portion 9, having a wedge face 11, preferably set at an angle of about 45° to the longitudinal axis, and a horizontal face 13. When assembled, as in Fig. 1, the wedge faces 11 cooperate, upon relative longitudinal movement of the shoes, to force the shoes into contact with the inner surface of the spring 1.

Blocks 15 of an elastic material, such as rubber, are interposed between the shoes 7, 7' and the follower plates 3, 5, bearing against the faces 13 of the shoes, and being centered on the follower plates by means of bosses 17 struck up from the metal thereof.

Upon the application of compressive force to either of the end followers 3, 5, they are caused to approach one another against the resistance of the spring 1. At the same time the compressive force is transmitted through the rubber blocks 15 to the shoes 7, 7', so that these shoes are pressed, by action of the wedge surfaces 11 thereof, against the inner surfaces of the coils of the spring 1 with a yielding force (due to the elasticity of the blocks 15) which nevertheless increases with the compressive force. The engagement of the shoes 7, 7' with the spring 1 acts, in accordance with well known physical laws, to dampen harmonic movements set up in the springs.

As the end followers 3, 5 continue to approach one another under a powerful compressive force, the material of the elastic blocks 15 will be expanded radially, by the longitudinal compression of the blocks, to such an extent as to fill the cylindrical space bounded by the skirt portions 19 of the shoes 7, 7', and great lateral forces will then be exerted against the skirt portions 19, forcing the shoes 7, 7' even more strongly against the coils of the spring 1.

As compression of the spring 1 continues toward the "solid point," i. e., the point where the coils meet, and before the coils meet, the edge 21 of the skirt portions 19 of shoes 7, 7' will engage a shoulder portion 23 of the elastic blocks 15. However, since the shoes 7, 7' are not, when assembled, positioned exactly symmetrically, for the edge 21 of each shoe extends some little distance, about 1/8"–1/4", beyond the adjacent edge 25 of the opposite shoe; the engagement of these edges 21 with the portion 23 of the blocks 15 before the edges 25 are engaged, will create a powerful force tending to relative longitudinal movement of the shoes 7, 7', which force will be translated by the wedge surfaces 11 into a lateral one, still further increasing the damping action of the shoes. At the same time this action will be somewhat cushioned by the elasticity of the shoulder portions 23 of the blocks 15.

The stepwise increases of resistance described augment the capacity of the device, and, in effect, make it the equivalent of three separate shock absorbers each having different characteristics. Additional control of the characteristics may be had by proper selection of the type of elastic material selected to form the blocks 15, which may vary from a comparatively hard to a comparatively soft rubber.

Figure 5:
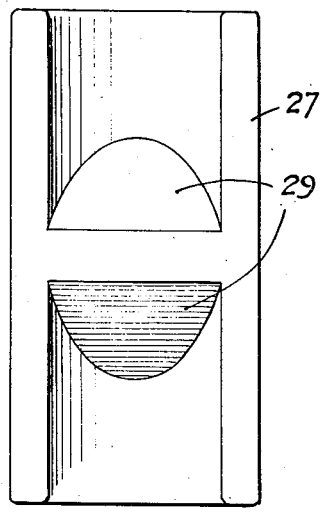
Figure 5 is a side view of the dampening shoe used in the structure of Figure 4.

In the structure shown in Figs. 4 and 5, each of the dampening shoes 27, 27' is provided, intermediate its ends, with a pair of oppositely disposed, forwardly and inwardly inclined, wedge surfaces 29. These wedge surfaces cooperate with complementary wedge elements 31, held in place by a pair of elastic blocks 15'. The wedge elements are secured to the blocks by means of an inturned flange 33 on their outer ends, which engages an annular groove 35 formed in the neck of the blocks 15'.

Figure 6:
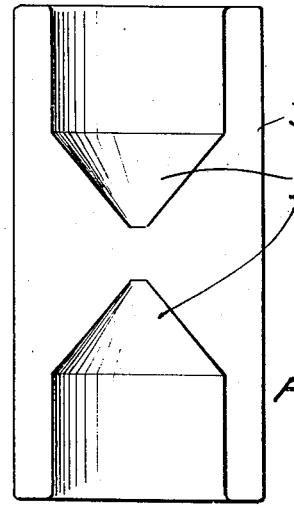
Figure 6 is a side view of a different type of dampening shoe for use in the structure of Figure 4.

In Fig. 6 is shown a dampening shoe 37 having conical wedge surfaces 39. It is designed for use in an assembly of the type shown in Fig. 4, with, of course, complementary wedge elements having conical surfaces.

As shown in Figs. 1 and 4, the device in accordance with this invention may be assembled for use without being first compressed and held together by retaining bolts, as is customary in devices of this character, since elastic blocks 15, 15', unlike springs, need exert no force upon the wedge elements when the assembly is under no load. This permits the spring 1 to function effectively throughout its entire range of movement, as well as allows more easy assembly of the structure.

The device in accordance with this invention also will be found to have special uses in connection with railway draft gears. It will be apparent to those skilled in the art that it can be used in such devices merely by replacing the follower plates 3 and 5 with followers suitably modified in dimension and design for use in railway draft gear assemblies.

Indeed, the device in accordance with this invention may be used advantageously in any case where augmentation of capacity and control of harmonic impulses, frequency, vibration or amplification is necessary.

This application is filed as, and constitutes, a continuation-in-part of my copending application Serial No. 194,067, filed March 5, 1938.

What I claim and desire to protect by Letters Patent is:

1. A shock absorbing device comprising, in combination, a pair of opposed follower plates, a helical spring extending therebetween, a plurality of segmental shoes adapted to engage the inner face of said spring, means for expanding said shoes on longitudinal compression of said device, each said shoe having a skirt portion at at least one end thereof, the skirt portions forming together an annulus defining an open cylindrical space, and a block of elastic material interposed between at least one of said followers and said expanding means and extending within said cylindrical space; the volume of said cylindrical space and that of said block being so related that on longitudinal compression of the said block it will fill said space by radial expansion before said spring can be compressed to an extent sufficient to bring its coils in contact, and thereby will on further compression exert a direct lateral force against the skirt portions of said shoes tending to expand said shoes.

2. A shock absorbing device comprising, in combination, a pair of opposed follower plates, a helical spring extending therebetween, a plurality of segmental shoes adapted to engage the inner face of said spring, means carried by said shoes for expanding said shoes on longitudinal compression of said device, each said shoe having a skirt portion at at least one end thereof, the skirt portions forming together an annulus defining an open cylindrical space, and a block of elastic material interposed between at least one of said followers and said expanding means and extending within said cylindrical space; the volume of cylindrical space and that of said block being so related that on longitudinal compression of the said block it will fill said space by radial expansion before said spring can be compressed to an extent sufficient to bring its coils in contact, and thereby will on further compression exert a direct lateral force against the skirt portions of said shoes tending to expand said shoes.

3. A shock absorbing device comprising, in combination, a pair of opposed follower plates, a helical spring extending therebetween, a plurality of segmental shoes adapted to engage the inner face of said spring, means carried by said shoes and comprising elements having opposed, cooperating wedge surfaces for expanding said shoes on longitudinal compression of said device, each said shoe having a skirt portion at at least one end thereof, the skirt portions forming together an annulus defining an open cylindrical space, and a block of elastic material interposed between at least one of said followers and said expanding means and extending within said cylindrical space; the volume of cylindrical space and that of said block being so related that on longitudinal compression of the said block it will fill said space by radial expansion before said spring can be compressed to an extent sufficient to bring its coils in contact, and thereby will on further compression exert a direct lateral force against the skirt portions of said shoes tending to expand said shoes.

4. A shock absorbing device comprising, in combination, a pair of opposed follower plates, a helical spring extending therebetween, a plurality of segmental shoes adapted to engage the inner face of said spring, means including a separate wedge element for expanding said shoes on longitudinal compression of said device, each said shoe having a skirt portion at at least one end thereof, the skirt portions forming together an annulus defining an open cylindrical space, and a block of elastic material interposed between at least one of said followers and said expanding means and extending within said cylindrical space; the volume of said cylindrical space and that of said block being so related that on longitudinal compression of the said block it will fill said space by radial expansion before said spring can be compressed to an extent sufficient to bring its coils in contact, and thereby will on further compression exert a direct lateral force against the skirt portions of said shoes tending to expand said shoes.

5. A shock absorbing device comprising, in combination, a pair of opposed follower plates, a helical spring extending therebetween, a plurality of segmental shoes adapted to engage the inner face of said spring, means for expanding said shoes on longitudinal compression of said device, each said shoe having a skirt portion at each end thereof, the skirt portions together forming annuli defining a pair of open cylindrical spaces, and a pair of blocks of elastic material, each block interposed between one of said follower plates and said expanding means and extending within one of said cylindrical spaces; the volume of said cylindrical space and that of said block being so related that on longitudinal compression of the said block it will fill said space by radial expansion before said spring can be compressed to an extent sufficient to bring its coils in contact, and thereby will on further compression exert a direct lateral force against the skirt portions of said shoes tending to expand said shoes.

6. A shock absorbing device comprising, in combination, a pair of opposed follower plates, a helical spring extending therebetween, a plurality of segmental shoes adapted to engage the inner face of said spring, means for expanding said shoes on longitudinal compression of said device, and a block of elastic material interposed between at least one of said followers and said expanding means; said block having a shoulder portion lying against the follower and between it and the ends of said shoes so that at least one of the shoes will contact said shoulder before the spring can be compressed to an extent sufficient to bring its coils into contact.

7. A shock absorbing device comprising, in combination, a pair of opposed follower plates, a helical spring extending therebetween, a plurality of segmental shoes adapted to engage the inner face of said spring, means carried by said shoes for expanding said shoes on longitudinal compression of said device, and a block of elastic material interposed between at least one of said followers and said expanding means; said block having a shoulder portion lying against the follower and between it and the ends of said shoes so that at least one of the shoes will contact said shoulder before the spring can be compressed to an extent sufficient to bring its coils into contact.

8. A shock absorbing device comprising, in combination, a pair of opposed follower plates, a helical spring extending therebetween, a plurality of segmental shoes adapted to engage the inner face of said spring, means carried by said shoes and comprising elements having opposed, cooperating wedge surfaces for expanding said shoes on longitudinal compression of said device, and a block of elastic material interposed between at least one of said followers and said expanding means; said block having a shoulder portion lying against the follower and between it and the ends of said shoes so that at least one of the shoes will contact said shoulder before the spring can be compressed to an extent sufficient to bring its coils into contact.

9. A shock absorbing device comprising, in combination, a pair of opposed follower plates, a helical spring extending therebetween, a plurality of segmental shoes adapted to engage the inner face of said spring, means including a separate wedge element for expanding said shoes on longitudinal compression of said device, and a block of elastic material interposed between at least one of said followers and said expanding means; said block having a shoulder portion lying against the follower and between it and the ends of said shoes so that at least one of the shoes will contact said shoulder before the spring can be compressed to an extent sufficient to bring its coils into contact.

10. A shock absorbing device comprising, in combination, a pair of opposed follower plates, a helical spring extending therebetween, a plurality of segmental shoes adapted to engage the inner face of said spring, means for expanding said shoes on longitudinal compression of said device, and a pair of blocks of elastic material, each block interposed between one of said follower plates and said expanding means; each said block having a shoulder portion lying against the follower and between it and the ends of said shoes so that at least one of the shoes will contact said shoulder before the spring can be compressed to an extent sufficient to bring its coils into contact.

11. A shock absorbing device comprising, in combination, a pair of opposed follower plates, a helical spring extending therebetween, a plurality of segmental shoes adapted to engage the inner face of said spring, means for expanding said shoes on longitudinal compression of said device, each said shoe having a skirt portion at at least one end thereof, the skirt portions forming together an annulus defining an open cylindrical space, and a block of elastic material interposed between at least one of said followers and said expanding means and extending within said cylindrical space; the volume of said cylindrical space and that of said block being so related that on longitudinal compression of the said block it will fill said space by radial expansion before said spring can be compressed to an extent sufficient to bring its coils in contact, and thereby will on further compression exert a direct lateral force against the skirt portions of said shoes tending to expand said shoes; said block also having a shoulder portion lying against the follower and between it and the ends of said shoes so that at least one of the shoes will contact said shoulder before the spring can be compressed to an extent sufficient to bring its coils into contact.

12. A shock absorbing device comprising, in combination, a pair of opposed follower plates, a helical spring extending therebetween, a plurality of segmental shoes adapted to engage the inner face of said spring, means for expanding said shoes on longitudinal compression of said device, each said shoe having a skirt portion at at least one end thereof, the skirt portions forming together an annulus defining an open cylindrical space, and a block of elastic material interposed between at least one of said followers and said expanding means and extending within said cylindrical space; the volume of said cylindrical space and that of said block being so related that on longitudinal compression of the said block it will fill said space by radial expansion before said spring can be compressed to an extent sufficient to bring its coils in contact, and thereby will on further compression exert a direct lateral force against the skirt portions of said shoes tending to expand said shoes; said block also having a shoulder portion lying against the follower and between it and the ends of said shoes, and the skirt portion of one of said shoes extending closer to said shoulder portion, when the device is uncompressed, than that of any other of said shoes, so that the said shoe will contact said shoulder before any other of said shoes and before the spring can be compressed to an extent sufficient to bring its coils into contact.

13. A shock absorbing device comprising, in combination, a pair of opposed follower plates, a helical spring extending therebetween, a pair of segmental shoes adapted to engage the inner face of said spring, means for expanding said shoes on longitudinal compression of said device, each said shoe having a skirt portion at at least one end thereof, the skirt portions forming together an annulus defining an open cylindrical space, and a block of elastic material interposed between at least one of said followers and said expanding means and extending within said cylindrical space; the volume of said cylindrical space and that of said block being so related that on longitudinal compression of the said block it will fill said space by radial expansion before said spring can be compressed to an extent sufficient to bring its coils in contact, and thereby will on further compression exert a direct lateral force against the skirt portions of said shoes tending to expand said shoes; said block also having a shoulder portion lying against the follower and between it and the ends of said shoes, and the skirt portion of one of said shoes extending closer to said shoulder portion, when the device is uncompressed, than that of the other of said shoes, so that the said shoe will contact said shoulder before the other of said shoes and before the spring can be compressed to an extent sufficient to bring its coils into contact.

14. A shock absorbing device comprising, in combination, a pair of opposed follower plates, a helical spring extending therebetween, a plurality of segmental shoes each adapted to engage the inner face of the said spring and provided on its inner surface intermediate its ends with a pair of opposed forwardly and inwardly inclined wedge faces, a pair of wedge members cooperating with said wedge faces, and a block of elastic material interposed between each wedge member, respectively, and each of said followers.

15. A shock absorbing device comprising, in combination, a pair of opposed follower plates, a helical spring extending therebetween, a plurality of segmental shoes adapted to engage the inner face of the said spring and provided on their inner surfaces intermediate their ends with forwardly and inwardly inclined wedge faces, a wedge member cooperating with said wedge faces, and a block of elastic material interposed between said wedge member and one of said followers, the wedge member having an inturned flange at its base interlocked with a peripheral recess formed in the surface of the elastic block.

16. A shock absorbing device comprising, in combination, a pair of opposed follower plates, a helical spring extending therebetween, a plurality of segmental shoes adapted to engage the inner face of the said spring, means for expanding said shoes on longitudinal compression of said device, and a disc of elastic material positioned against one of said followers and between it and the ends of said shoes so that at least one of the shoes will contact said disc before the said spring can be compressed to an extent sufficient to bring its coils in contact.

THOMAS G. RABBITT.